United States Patent
Li et al.

(10) Patent No.: US 12,060,226 B2
(45) Date of Patent: Aug. 13, 2024

(54) METHOD FOR DELIVERING MATERIALS, ELECTRONIC DEVICE AND STORAGE MEDIUM

(71) Applicants: Chongqing BOE Optoelectronics Technology Co., Ltd., Chongqing (CN); BOE Technology Group Co., Ltd., Beijing (CN)

(72) Inventors: Bing Li, Beijing (CN); Baibing Liu, Beijing (CN); Jun Cheng, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 642 days.

(21) Appl. No.: 17/419,695

(22) PCT Filed: Oct. 23, 2020

(86) PCT No.: PCT/CN2020/123366
§ 371 (c)(1),
(2) Date: Jun. 29, 2021

(87) PCT Pub. No.: WO2021/078278
PCT Pub. Date: Apr. 29, 2021

(65) Prior Publication Data
US 2022/0081210 A1    Mar. 17, 2022

(30) Foreign Application Priority Data
Oct. 23, 2019   (CN) .......................... 201911013742.7

(51) Int. Cl.
*B65G 1/137*     (2006.01)
*G06Q 10/047*    (2023.01)
(Continued)

(52) U.S. Cl.
CPC ......... *B65G 1/1373* (2013.01); *G06Q 10/047* (2013.01); *G06Q 10/06314* (2013.01);
(Continued)

(58) Field of Classification Search
CPC .............. B65G 1/1373; G06Q 10/047; G06Q 10/06314; G06Q 10/0633; G06Q 10/08; G06Q 50/04
See application file for complete search history.

(56) References Cited

U.S. PATENT DOCUMENTS 8,359,244 B1 *   1/2013  Fukuya ................. G06Q 10/06
                                                           705/26.5
2003/0050819 A1 *  3/2003  Koenigbauer ..... G06Q 10/0637
                                                              700/95

(Continued)

FOREIGN PATENT DOCUMENTS

CN   102044023 A   5/2011
CN   103106559 A   5/2013
(Continued)

OTHER PUBLICATIONS

CN201911013742.7 first office action.

*Primary Examiner* — Kyle O Logan
(74) *Attorney, Agent, or Firm* — IPro, PLLC

(57) ABSTRACT

Provided is a method for delivering materials, including: acquiring a material delivery model of a target product, wherein the material delivery model includes a delivery route of the target product and a number of delivery times of each of a plurality of logistics transport devices travelling along the delivery route within unit time; generating, for each logistics transport device, delivery instructions within the unit time, based on the number of delivery times, wherein a number of the delivery instructions is equal to the number of delivery times of the corresponding logistics (Continued)

transport device; and sending the delivery instructions to the corresponding logistics transport devices.

19 Claims, 4 Drawing Sheets

(51) Int. Cl.
*G06Q 10/0631* (2023.01)
*G06Q 10/0633* (2023.01)
*G06Q 10/08* (2023.01)
*G06Q 50/04* (2012.01)

(52) U.S. Cl.
CPC ......... *G06Q 10/0633* (2013.01); *G06Q 10/08* (2013.01); *G06Q 50/04* (2013.01)

(56) References Cited

U.S. PATENT DOCUMENTS

| | | | |
|---|---|---|---|
| 2007/0198333 A1 | 8/2007 | Wang et al. | |
| 2017/0110017 A1* | 4/2017 | Kimchi | B64U 10/14 |
| 2017/0270466 A1 | 9/2017 | Kao et al. | |
| 2019/0062055 A1* | 2/2019 | Hance | G01C 21/3407 |
| 2022/0092537 A1 | 3/2022 | Li et al. | |

FOREIGN PATENT DOCUMENTS

| | | |
|---|---|---|
| CN | 106529871 A | 3/2017 |
| CN | 107203825 A | 9/2017 |
| CN | 108734388 A | 11/2018 |
| CN | 108898333 A | 11/2018 |
| CN | 109345017 A | 2/2019 |
| CN | 110334852 A | 10/2019 |

\* cited by examiner

METHOD FOR DELIVERING MATERIALS, ELECTRONIC DEVICE AND STORAGE MEDIUM

This application is a national phase application based on PCT/CN2020/123366, filed on Oct. 23, 2020, which claims priority to the Chinese Patent Application No. 201911013742.7, filed on Oct. 23, 2019 and entitled "SYSTEM AND METHOD FOR DELIVERING MATERIALS, ELECTRONIC DEVICE AND STORAGE MEDIUM", the disclosures of which are incorporated herein by reference in their entireties.

TECHNICAL FIELD

The present disclosure relates to the field of material delivery technologies, in particular to a material delivery method and apparatus, electric device, and storage medium.

BACKGROUND

In the production process of products, ensuring the smooth delivery of materials is vital to the normal production of the entire factory.

SUMMARY

The present disclosure provides a method and apparatus for delivering materials, an electronic device and a storage medium.

An embodiment of the present disclosure provides a method for delivering materials. The method includes:
  acquiring a material delivery model of a target product, wherein the material delivery model includes a delivery route of the target product and a number of delivery times of each logistics transport device travelling along the delivery route within unit time;
  generating, for each logistics transport device, delivery instructions within the unit time, based on the number of delivery times, wherein a number of the delivery instructions is equal to the corresponding number of delivery times; and
  sending the delivery instructions to the corresponding logistics transport devices.

Optionally, said generating, for each logistics transport device, delivery instructions within the unit time, based on the number of delivery times includes:
  generating, within the unit time and with a set time interval, delivery instructions for a first logistics transport device until a number of generated delivery instructions for the first logistics transport device reaches the number of delivery times corresponding to the first logistics transport device, wherein the first logistics transport device is one logistics transport device travelling along the delivery route.

Optionally, the number of delivery times of the logistics transport device is calculated based on an amount of materials required for producing the target product within the unit time, and a capacity of the logistics transport device.

Optionally, the method further includes:
  acquiring logistics delivery data of each logistics transport device; and
  performing a warning of an abnormal delivery of the logistics transport device based on the logistics delivery data and the material delivery model.

Optionally, the logistics delivery data includes a receiving time at which materials are received by a material storage device corresponding to the logistics transport device, and a delivery starting address and a delivery starting time of the materials; and
  said performing a warning of an abnormal delivery of the logistics transport device based on the logistics delivery data and the material delivery model, includes:
    determining a number of normally-executed delivery instructions within the unit time based on the receiving time, the delivery starting address and the delivery starting time; and
    performing the warning when the number of the normally-executed delivery instructions does not match the number of delivery times.

Optionally, a condition for determining that the number of the delivery instructions does not match the number of delivery times includes any of the followings:
  a difference between the number of the normally-executed delivery instructions and the number of delivery times exceeds a difference threshold; or
  a ratio of the difference between the number of the normally-executed delivery instructions and the number of delivery times to the number of delivery times exceeds a ratio threshold.

Optionally, said performing the warning when the number of the normally-executed delivery instructions does not match the number of delivery times, includes:
  performing the warning when the number of the normally-executed delivery instructions does not match the number of delivery times through at least one of the following manners:
  generating warning information in email, and sending the warning information in email to an email address of a preset recipient; and
  popping out a warning window in a designated page, and displaying delivery warning information in the warning window.

Optionally, each logistics transport device corresponds to a material storage device, and the method further includes:
  monitoring an amount of remaining materials in the material storage device;
  generating and sending prompt information for prompting that the materials are excessive in amount when the amount of the remaining materials is greater than a first amount threshold; and/or,
  generating and sending prompt information for prompting that the materials are few in amount when the amount of remaining materials is less than a second amount threshold,
  wherein the first amount threshold is greater than the second amount threshold.

Optionally, each logistics transport device travelling along the delivery route of the target product corresponds to a plurality of production devices of the target product, and each production device corresponds to one material storage device, and the method further includes:
  acquiring a plurality of starting positions corresponding to the materials of the target product and device positions of the production devices corresponding to the target product;
  generating a plurality of delivery routes between the plurality of starting positions and the device positions of the production devices according to a production process of the target product; and
  selecting one delivery route from the plurality of delivery routes as the delivery route in the delivery model according to a first rule.

An embodiment of the present disclosure provides an apparatus for delivering materials. The apparatus includes:
- a model acquiring module, configured to acquire a material delivery model of a target product, wherein the material delivery model includes a delivery route of the target product and a number of delivery times of each logistics transport device travelling along the delivery route within unit time;
- a generating module, configured to generate, for each logistics transport device, delivery instructions within the unit time, based on the number of delivery times; and
- a sending module configured to send the delivery instructions to the corresponding logistics transport devices.

Optionally, the generating module is configured to generate, within the unit time and with a set time interval, delivery instructions for a first logistics transport device until a number of generated delivery instructions for the first logistics transport device reaches the number of delivery times corresponding to the first logistics transport device, wherein the first logistics transport device is one logistics transport device travelling along the delivery route.

Optionally, the number of delivery times of the logistics transport device is calculated based on an amount of materials required for producing the target product within the unit time, and a capacity of the logistics transport device.

Optionally, the apparatus further includes:
- a data acquiring module, configured to acquire logistics delivery data of each logistics transport device; and
- a warming module, configured to perform a warning of an abnormal delivery of the logistics transport device based on the logistics delivery data and the material delivery model.

Optionally, the logistics delivery data includes a receiving time at which materials are received by a material storage device corresponding to the logistics transport device, and a delivery starting address and a delivery starting time of the materials; and
the warming module includes:
- a determining sub-module, configured to determine a number of normally-executed delivery instructions within the unit time based on the receiving time, the delivery starting address and the delivery starting time; and
- a warning sub-module, configured to perform the warning when the number of the normally-executed delivery instructions does not match the number of delivery times.

Optionally, a condition that the number of the delivery instructions does not match the number of delivery times includes any of the followings:
- a difference between the number of the normally-executed delivery instructions and the number of delivery times exceeds a difference threshold; or
- a ratio of the difference between the number of the normally-executed delivery instructions and the number of delivery times to the number of delivery times exceeds a ratio threshold.

Optionally, the warning module is configured to perform the warning when the number of the normally-executed delivery instructions does not match the number of delivery times through at least one of the following manners:
- generating warning information in email, and sending the warning information in email to an email address of a preset recipient; and
- popping out a warning window in a designated page, and displaying delivery warning information in the warning window.

Optionally, each logistics transport device corresponds to a material storage device, and the apparatus further includes:
- a monitoring module, configured to monitor an amount of remaining materials in the material storage device;
- a prompting module, configured to generate and send prompt information for prompting that the materials are excessive in amount when the amount of the remaining materials is greater than a first amount threshold; and/or, generate and send prompt information for prompting that the materials are few in amount when the amount of remaining materials is less than a second amount threshold,
wherein the first amount threshold is greater than the second amount threshold.

Optionally, each logistics transport device travelling along the delivery route of the target product corresponds to a plurality of production devices of the target product, and the apparatus further includes:
- a delivery route generating module, configured to acquire a plurality of starting positions corresponding to the materials of the target product and device positions of the production devices corresponding to the target product; generate a plurality of delivery routes between the plurality of starting positions and the device positions of the production devices according to a production process of the target product; and select one delivery route from the plurality of delivery routes as the delivery route in the delivery model according to a first rule.

An embodiment of the present disclosure provides an electronic device. The electronic device includes:
a processor, a memory, and a computer program that is stored in the memory and operable on the processor, wherein when executing the program, the processor is configured to implement any of the above-described method for delivering materials.

An embodiment of the present disclosure provides a computer-readable storage medium, in which a computer program is stored, wherein the program, when being executed by a processor, implements any of the above-described methods for delivering materials.

DETAILED DESCRIPTION

In order to make the above objectives, features and advantages of the present disclosure more clear and understandable, a further detailed description will be made to the present disclosure below with reference to the accompanying drawings and specific embodiments.

To facilitate the understanding of the embodiments of the present disclosure, the application scenarios of the embodiments of the present disclosure are briefly introduced first in the following.

A material storage warehouse, production devices, material storage devices, logistics transport devices, etc. are provided in a factory. Among them, the material storage warehouse is configured to store materials for respective products.

The production devices are configured to perform a series of processing on the materials for the products, so as to obtain intermediate semi-finished products or final products. Each production device may correspond to one or more procedures of a product. Therefore, from processing the materials to obtaining the final products, the materials need to pass through one or more production devices.

The material storage devices are configured to temporarily store the products before and/or after the processing by a production device. Generally, each production device corresponds to one material storage device. The material storage device is usually disposed near the corresponding production device.

The logistics transport devices are configured to transport materials among the material storage warehouse, the production devices and material storage devices, e.g., transport the materials from a material storage warehouse to a material storage device or a production device, or transport the materials processed by a certain process to a material storage device, etc.

In the embodiments of the present disclosure, material delivery refers to a process of acquiring materials from the material storage warehouse, then sequentially delivering the materials to the respective production devices corresponding to the products for processing, and finally obtaining the final products.

Figure 1:
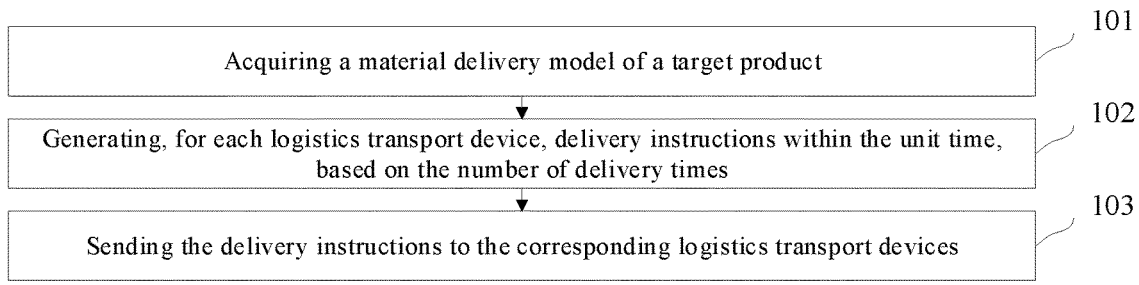
FIG. 1 shows a schematic flow diagram of a method for delivering materials according to an embodiment of the present disclosure.

FIG. 1 shows a flowchart of a method for delivering materials according to an embodiment of the present disclosure. The method may be executed by an electronic device, which includes but is not limited to a server or a terminal device, etc. As shown in FIG. 1, the method for delivering materials includes the following steps.

In step 101, a material delivery model of a target product is acquired.

The material delivery model includes a delivery route of a target product, and a number of delivery times of each logistics transport device travelling along the delivery route within unit time. The material delivery model is generated in advance before the method shown in FIG. 1 is executed.

The delivery route is generated according to a production process of the target product. For example, the production process of the target product includes at least one process, and each process corresponds to at least one logistics transport device. As such, the delivery route is obtained by connecting the corresponding logistics transport devices in series according to a sequence for executing the processes.

Exemplarily, there be a plurality of production devices for performing a same process in the factory, and each production device corresponds to a different logistics transport device. The production device configured to produce a target product may be selected by a user, or may be selected by an electronic device according to a certain rule, for example, according to the principle of obtaining a shortest route.

Herein, the unit time refers to a certain production duration, which may be set according to actual production requirements. For example, the unit time may be one day, one hour, two hours, and the like.

Exemplarily, the number of delivery times of each logistics transport device is determined based on a capacity of the logistics transport device and production requirements of the target product.

A mapping relationship between the target products and the material delivery models is stored in the electronic device. The step 101 includes: in response to receiving the target product selected by the user, acquiring a material delivery model corresponding to the target product according to the mapping relationship.

In step 102, within the unit time, delivery instructions for each logistics transport device are generated based on the number of delivery times.

The delivery instructions are configured to instruct the corresponding logistics transport devices to deliver materials. A number of the delivery instructions is equal to the corresponding number of delivery times.

Optionally, the delivery instructions include a delivery starting address and a delivery destination address, and are configured to instruct the corresponding logistics transport device to transport the materials from a device corresponding to the delivery starting address to a device corresponding to the delivery destination address.

Exemplarily, the delivery starting address is an address of an upstream node in the delivery route. For example, with respect to a first logistics transport device, the upstream node is the material storage warehouse; and with respect to a second logistics transport device, the upstream node is the logistics storage device corresponding to the previous process.

The delivery destination address may be an address of the production device, or an address of the material storage device corresponding to the production device.

In step 103, the delivery instructions are sent to the corresponding logistics transport device.

After receiving the delivery instructions, the logistics transport device transports the materials according to the delivery instructions.

By containing the number of delivery times of the respective logistics transport devices in the material delivery model, and controlling the logistics transport devices to transport the materials based on the number of delivery times, the logistics delivery process of the target product can be standardized, so that the normal production of the target product can be ensured.

Figure 2:
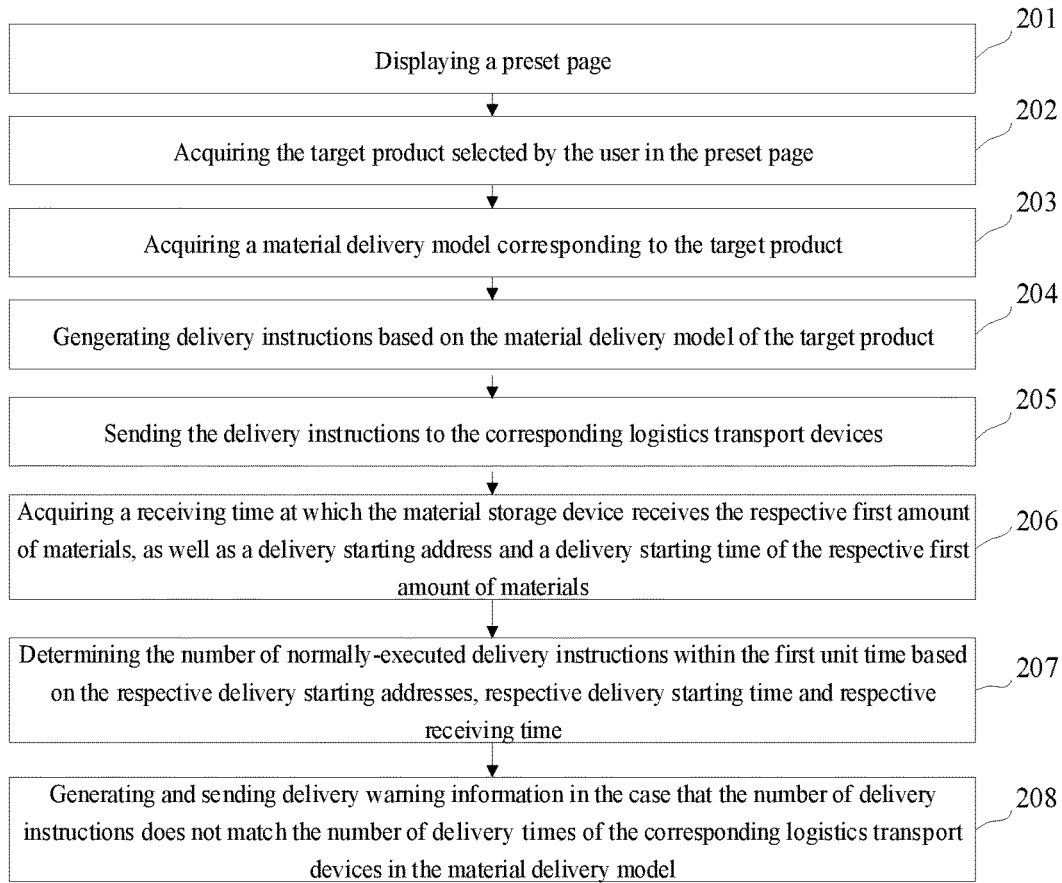
FIG. 2 shows a schematic flow diagram of another method for delivering materials according to an embodiment of the present disclosure.

FIG. 2 shows a flowchart of a method for delivering materials according to an embodiment of the present disclosure. As shown in FIG. 2, the method for delivering materials includes the following steps.

In step 201, a preset page is displayed.

In the embodiments of the present disclosure, the preset page may be a hypertext markup language (HTML) page or a web page. The form of the preset page can be determined according to business requirements, which is not limited in the present disclosure.

In a technology that needs to visualize a production process of a product, a browser/server (BS, a B/S mode) platform may be built in advance (e.g., Angular 5, CSS, html5 or other technologies are used at a front end, and a Java or other technologies are used at a back end). The B/S mode enables the clients to be unified and makes the core parts of system function implementations be centralized in a server, which simplifies the development, maintenance and use of the system.

After the BS platform is built, a preset page may be generated on a client side (that is, a side for controlling business process). A plurality of products to be produced, information about material delivery route of each product to be produced in the production process, or the like can be added to the preset page, so as to realize the visualization of the production process flow.

In the present disclosure, the preset page is a product managing interface, and a plurality of operable buttons are provided in the interface. A business personnel may generate corresponding instructions by clicking the buttons. Specifically, a detailed description will be made in conjunction with the following processes.

In step 202, the target product selected by the user in the preset page is acquired.

A plurality of products to be produced are added to the preset page. The target product includes one or more products to be produced selected by the user from a plurality of products to be produced. In the following steps of the present disclosure, a delivery process is described by taking the target product being one product as an example.

Product identifiers (such as image identifiers or text identifiers) corresponding to the plurality of products to be produced can be displayed in the preset page. The user may select one product that needs to be produced from the preset page as the target product.

The target product selected by the user may be acquired in real time. For example, the product identifiers of the plurality of products to be produced in the preset page are monitored. After it is monitored that the user clicks on the product identifier of a certain product to be produced, the product to be produced is taken as the target product, etc.

In step 203, a material delivery model corresponding to the target product is acquired.

The material delivery model includes a delivery route of the target product, and a number of delivery times of each logistics transport device travelling along the delivery route within unit time. The material delivery model is generated and stored before the method shown in FIG. 2 is executed.

Optionally, in addition to the contents contained in the material delivery model in step 101, the material delivery model may also include the number of delivery instructions for the target product in one delivery process. For example, the number of delivery instructions for the target product in one production process is equal to the number of delivery times for the target product in one production process, that is, the number of logistics transport devices passed through.

Optionally, the material delivery model may further include a number of delivery instructions for the target product within unit time. For example, the number of delivery instructions for the target product within the unit time may be equal to a sum of the number of delivery times of each logistics transport device travelling along the delivery route of the target product within the unit time.

In the embodiments of the present disclosure, each product corresponds to one material delivery model. In a client system, a mapping relationship between the product identifier of each product and a model identifier of the corresponding material delivery model may be built in advance, as shown in Table 1 below:

TABLE 1

| Product identifier | Model identifier |
| --- | --- |
| Product A | Model 1 |
| Product B | Model 2 |
| Product C | Model 3 |

As shown in Table 1, product A corresponds to model 1, product B corresponds to model 2, and product C corresponds to model 3.

After the mapping relationship between the respective product identifiers and the corresponding model identifiers are built, it may be saved in the client side.

It may be understood that, the foregoing examples are only examples enumerated for a better understanding of the technical solutions of the embodiments of the present disclosure, and are not intended to be the only limitation to the embodiments of the present disclosure.

Through steps 201 to 203, the material delivery model corresponding to the target product can be acquired.

Figure 3:
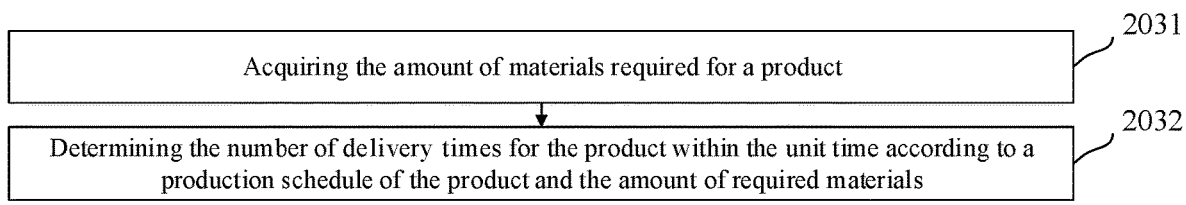
FIG. 3 shows a schematic diagram of a process for determining the number of delivery times in a material delivery model according to an embodiment of the present disclosure.

Optionally, the method shown in FIG. 3 may be used for the generation process of the material delivery model of any product. As shown in FIG. 3, the process of determining the number of delivery times of each logistics transport device in the material delivery model includes the following steps.

In step 2031, the amount of materials required for a product is acquired.

In the embodiments of the present disclosure, the amount of materials refers to the amount of materials required for producing each product. Optionally, the amount of materials may be the amount of materials required for producing a product within a period of time (for example, per day), or may be the amount of materials required for producing a batch of products (such as products ordered by a customer in an order, and the like).

In step 2031, the amount of materials required for a product may be calculated based on the amount of the products produced every day; or the total amounts of required materials may be calculated based on the amounts of a batch of products.

In step 2032, the number of delivery times for the product within the unit time is determined according to a production schedule of the product and the amount of required materials.

The production schedule refers to a process flow for producing a product. For example, some manufacturers produce products continuously for 24 hours every day, and the production schedule is referred to as a continuous production; while some manufacturers produce products continuously for 8 hours every day, and the production schedule is referred to as a daily production, etc.

The production schedule can be used to determine the unit time. For example, with respect to the continuous production for 24 hours every day, the unit time may be 24 hours; and with respect to the continuous production of products for 8 hours every day, the unit time may be 8 hours.

The number of delivery times refers to the number of times of delivering materials required within the unit time during the production of a product.

Figure 4:
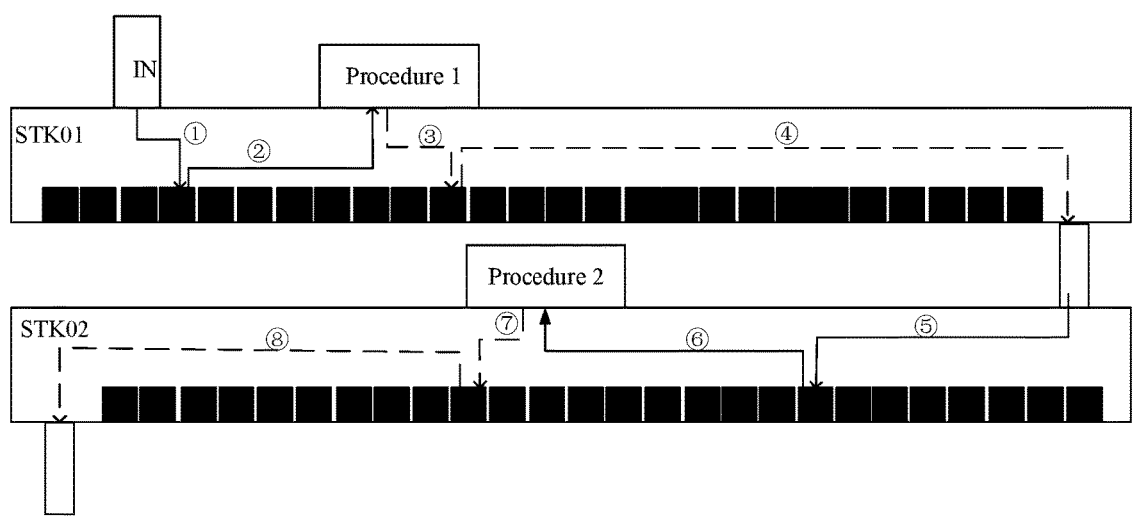
FIG. 4 shows a schematic diagram of a delivery route according to an embodiment of the present disclosure.

In the delivery process, one delivery may be regarded as a complete procedure. For example, referring to FIG. 4, a schematic diagram of a delivery route according to an embodiment of the present disclosure is shown. As shown in FIG. 4, during the material delivery process, one or more transfer nodes may be disposed. For example, a material storage device may be arranged prior to and/or post a production device. The word "IN" shown in FIG. 4 refers to acquiring materials to be delivered from the material storage warehouse; procedure 1 refers to delivering the materials from the material storage warehouse to the material storage device; and procedure 2 refers to delivering the materials from material storage device to the production device. While in the delivery process, a plurality of transfer nodes (i.e., a plurality of steps) may be required, such as ①, ②, ..., and ⑧ in FIG. 4, thereby completing one delivery process.

As shown in FIG. 4, the production flow of the product needs to go through two procedures, procedure 1=step ①+step ②+step ③+step ④; and procedure 2=step ⑤+step ⑥+step ⑦+step ⑧, wherein procedure 1 corresponds to logistics transport device STK01, and procedure 2 corresponds to logistics transport device STK02. The logistics transport devices STK01 and STK02, collectively, form the delivery route in the material delivery model.

It should be noted that, in the case shown in FIG. 4, each procedure includes four steps, and the four steps correspond to the following processes respectively: acquiring materials from the warehouse or the material storage device corresponding to the previous procedure, and putting the materials into the material storage device corresponding to the current procedure; acquiring the materials from the material storage device corresponding to the current procedure, and transporting the materials to the production device of the current procedure; after the processing performed by production device is finished, transporting the materials from the production device to the material storage device corresponding to the current procedure and configured to store the materials processed by the production device; and transporting the materials processed by the production device from the corresponding material storage device to the material storage device corresponding to the next procedure or to a storage position of the target product. In some examples, a portion of the logistics transport devices may only include one step. For example, for a logistics transport device only used for transfer, it may only involve putting the materials acquired from the warehouse or the material storage device corresponding to the previous procedure into the material storage device corresponding to the current procedure. After receiving the delivery instructions, the logistics transport device may execute one or more of the corresponding steps according to needs, and the sequence of executing the steps may also be selected according to needs. This is the internal process of the logistics transport devices and is not limited in the present disclosure.

It may be understood that, the foregoing examples are only examples enumerated for a better understanding of the technical solutions of the embodiments of the present disclosure, and are not intended to be the only limitation to the embodiments of the present disclosure.

Exemplarily, the number of delivery times of each logistics transport device within the unit time may be calculated by using the following formula (1):

$$Y=F/(a*X) \qquad (1)$$

In formula (1), Y refers to the number of delivery times; F refers to the amount of materials, which is determined according to actual production requirements; a refers to a capacity of the transport device; X refers to unit time, which may be a day, an hour or a minute, and may be set according to requirements.

Optionally, in the embodiments of the present disclosure, the delivery route in the material delivery model of the product may be generated in the following manner.

In the first step, a plurality of starting positions corresponding to the materials, and device positions of the corresponding production devices are acquired.

In the embodiments of the present disclosure, the starting position refers to a position from which the materials are transported to the material storage device of a respective procedure. For example, when the materials in the material storage warehouse are needed to be transported to the material storage device, the position where the material storage warehouse is disposed is the starting position. It may be understood that, a manufacturer may have a plurality of material storage warehouses, and the positions of these material storage warehouses, i.e., a plurality of starting positions, may be acquired respectively.

The device positions may refer to the positions where the material storage devices corresponding to the production devices for producing the target product is located. It should be noted that, in a factory, there may be a plurality of production devices that are used to complete the same processing step. At this time, the device positions of the plurality of production devices can be acquired.

In actual applications, the method for acquiring the starting positions and the device positions may be acquired by a sensor, or may be provided manually. Specifically, it may be determined according to business requirements, which is not limited in the embodiments of the present disclosure.

In the second step, after the plurality of starting positions corresponding to the materials and the device positions of the production devices are acquired, the delivery routes between the respective starting positions and the corresponding device positions are acquired, and the respective delivery routes are displayed in the preset page.

The delivery route refers to a route formed by delivering the materials from the starting position to the device position of the last procedure. After the plurality of starting positions and the device positions are acquired, a plurality of delivery routes may be acquired based on the plurality of starting positions and the device positions. Further, the plurality of delivery routes may be displayed in the preset page.

In the third step, a delivery route with the shortest distance is selected from the plurality of delivery routes as the route for acquiring the materials.

After the plurality of delivery routes are acquired and displayed, based on the distance of each delivery route, a shortest delivery route may be selected as the route for acquiring the materials.

After the shortest route is selected as the material delivery route, the materials may be delivered from a warehouse or other positions to the production device based on the selected delivery route with the shortest distance.

While in the actual material delivery process, there may also be a congested delivery route, and then, the congested section may be adjusted by the user or by the system.

In the case of a plurality of production devices, the delivery route with the shortest distance as selected for each production device is displayed in the preset page.

In the embodiments of the present disclosure, in the case of a plurality of production devices, it means that the target product is produced by using the plurality of production devices. At this time, the delivery route corresponding to each production device can be displayed in the preset page.

Whether there is a congested delivery route is determined according to the plurality of delivery routes as displayed.

Exemplarily, the congested delivery route refers to a delivery route where a crossing occurs in the preset page.

After the plurality of delivery routes are displayed in the preset page, whether a congested delivery route exists can be checked in the preset page. When the existence of the congested delivery route is determined through the preset page, the congested delivery route is adjusted by the user.

When a congested delivery route exists, an adjustment can be made to the congested delivery route to avoid a material delivery delay caused by the congestion of the delivery route, in the process of using the plurality of production devices to produce products.

In some examples, when a congested delivery route exists, the congested delivery route can be adjusted by an operator himself based on a congestion status displayed in the preset page.

In some examples, when a congested delivery route exists, the system may automatically select other delivery routes, and select, from these delivery routes, a delivery route that is relatively short in distance and would not interfere with the existing delivery route.

It may be understood that, the foregoing examples are only examples enumerated for a better understanding of the technical solutions of the embodiments of the present disclosure, and are not intended to be the only limitation to the embodiments of the present disclosure.

In step 204, delivery instructions are generated based on the material delivery model of the target product.

A production instruction refers to an instruction configured to instruct to start the production of the target product.

Optionally, the step 204 is executed in the case that a production instruction for the target product given by the user in the preset page is received.

In some examples, a trigger button corresponding to the production instruction may be set in the preset page in advance. The user may trigger the generation of the production instruction by clicking this button.

In some examples, a voice input interface may be set in the preset page in advance. Through the voice input interface, a voice input by the user that triggers the production instruction can be acquired; and after the voice is recognized, the corresponding production instruction can be generated.

It may be understood that, the foregoing examples are only examples enumerated for a better understanding of the technical solutions of the embodiments of the present disclosure, and are not intended to be the only limitation to the embodiments of the present disclosure.

The step 204 may include:

starting from the production of the target product and within the unit time, every time a set time period lapses, one delivery instruction is generated for each logistics transport device.

The set time period may be acquired by dividing the length of the unit time by the number of delivery times. For example, assuming that the length of the unit time is 8 hours and the number of delivery times is 4, then one delivery instruction may be generated every 2 hours.

It should be noted that, for each logistics transport device and within the unit time, the time point at which a delivery instruction is generated for the first time may be preset according to actual situations.

Exemplarily, for each logistics transport device and within the unit time, the time point at which the delivery instruction is generated for the first time is determined based on a processing time required by the procedure(s) prior to the procedure to which the specific logistics transport device belongs in the production flow of the target product. For example, with respect to the logistics transport device in the first procedure, the time point at which the delivery instruction is generated for the first time may be at a starting time point of the unit time. For example, in the 8-hour production every day, the production starts at 8 o'clock, and then the time point at which the delivery instruction is generated for the first time is 8 o'clock. With respect to the logistics transport device in the second procedure, the time point at which the delivery instruction is generated for the first time is determined based on the processing time required for the first procedure. For example, if the processing time required for the first procedure is 1 hour, then the time point at which the delivery instruction is generated for the first time will be 9 o'clock.

In step 205, the delivery instructions are sent to the corresponding logistics transport devices.

In the embodiments of the present disclosure, each time a delivery instruction is generated, this delivery instruction is sent to the corresponding logistics transport device.

After receiving the delivery instruction, the logistics transport device acquires a designated amount of materials, and delivers the materials to the corresponding production device.

The designated amount of materials refers to an amount of materials carried by the transport device in each delivery. For example, when the transport device carries 10 pieces of glass each time, then the designated amount is 10, etc.

Optionally, the delivery instruction includes a delivery starting address and a delivery destination address, and is configured to instruct the corresponding logistics transport device to transport the materials from a device corresponding to the delivery starting address to a device corresponding to the delivery destination address.

Exemplarily, the delivery starting address refers to an address of an upstream node in the delivery route. For example, with respect to the first logistics transport device, the upstream node is the material storage warehouse; and with respect to the second logistics transport device, the upstream node is the logistics storage device corresponding to the previous procedure.

The delivery destination address may be an address of the production device, or an address of the material storage device corresponding to the production device.

In one implementation of the present disclosure, the delivery instruction is configured to instruct the logistics transport device to acquire a first amount of materials, and transport the first amount of materials to the material storage device. The delivery instruction is also configured to instruct the logistics transport device to acquire a second amount of materials from the material storage device, and deliver the second amount of materials to the production device so as to produce the target product.

Of course, it is not limited to this. In the delivery process, other transfer nodes may also be set in advance, and then it needs to set corresponding delivery instructions. Specifically, it may be determined according to actual situations, which is not limited in the embodiments of the present disclosure.

In the embodiments of the present disclosure, through the preset material delivery model, corresponding delivery instructions can be generated to carry out the material delivery, which can reduce the idle time of the devices and increase the production capacity.

Optionally, in the process of delivering materials for the target product, the logistics delivery data corresponding to the respective logistics transport devices may also be acquired, and the process of delivering materials may be monitored based on the logistics delivery data and the material delivery model. In the case that an abnormality appears in the delivery process, a warning information may further be sent to the operator in the preset page, to remind the operator that there is a problem in the delivery process.

In this case, the method further includes the following steps.

In step 206, a receiving time at which the material storage device receives the respective first amount of materials, as well as a delivery starting address and a delivery starting time of the respective first amount of materials are acquired.

In the embodiments of the present disclosure, the receiving time refers to a time point at which the material storage device receives the first amount of materials. For example, the time point at which the first amount of materials is received is 10:00, 10:20, 10:35, or the like. The receiving time may be manually entered. Alternatively, whether the materials are received is monitored through a monitoring device such as a sensor, and a current time is acquired through a software when the materials are received.

The delivery starting address refers to a starting address where the first amount of materials are delivered to the material storage device. That is, in the case that materials are acquired from a material storage warehouse or a material storage device corresponding to the previous procedure, and are delivered to the material storage device, then this warehouse will be regarded as the delivery starting address. For example, when the first amount of materials are acquired from warehouse 1 and warehouse 3, and delivered to the material storage device, then warehouse 1 and warehouse 3 are regarded as the delivery starting addresses.

The delivery starting time refers to the time point at which the first amount of materials are initially delivered from the delivery starting address, that is, the time point at which the logistics transport device acquires the first amount of materials from the delivery starting address.

In step 207, the number of normally-executed delivery instructions within the unit time is determined based on the respective delivery starting addresses, respective delivery starting time and respective receiving time.

In step 208, delivery warning information is generated and sent in the case that the number of delivery instructions does not match the number of delivery times of the corresponding logistics transport devices in the material delivery model.

If the number of delivery instructions calculated as above does not match the number of delivery times of the corresponding logistics transport devices in the material delivery model, it means that the number of delivery instructions does not match the model during the production of the target product, which may cause the circumstance that certain production devices are in an idle state. Then, the delivery warning information may be sent to prompt the user to adjust the delivery instructions.

In one possible implementation, when a target factor value in the logistics delivery data matches an indicated value in the delivery instruction (e.g., the target factor value is the same as the indicated value), then this delivery instruction is considered to be executed normally. Herein, the target factor includes at least one of the delivery starting addresses, the respective delivery starting time and the respective receiving time, which may be set according to actual needs.

Exemplarily, the mismatch, between the number of the normally-executed delivery instructions and the number of delivery times of the corresponding logistics transport devices in the material delivery model, means that a difference between the number of the normally-executed delivery instructions and the number of delivery times exceeds a difference threshold; and a ratio of the difference between the number of the normally-executed delivery instructions and the number of delivery times to the number of delivery times exceeds a ratio threshold.

In some examples, the delivery warning information may be at least one of warning information in email and warning information displayed in a pop-out window.

In one possible implementation, the method includes: generating warning information in email, and sending the warning information in email to an email address of a preset recipient.

In the embodiments of the present disclosure, the delivery warning information may be warning information in email. The delivery warning information may be generated in the case that the number of delivery instructions does not match the number of delivery times of the corresponding logistics transport device in the material delivery model. Furthermore, based on an email address of a recipient stored in an electronic device, an email title and email content may be set, then a postman object may be obtained, and a user's own email account and password are then connected. Furthermore, the warning information in email is sent to an email address of the preset recipient.

In another possible implementation, the method includes: popping out a warning window in a designated page, and displaying the delivery warning information in the warning window.

When the delivery warning information is the warning information displayed in pop-out window, in the case that the number of delivery instructions does not match the number of delivery times of the corresponding logistics transport devices in the material delivery model, a warning window pops out at the preset page and the delivery warning information is displayed in the warning window.

Figure 5:
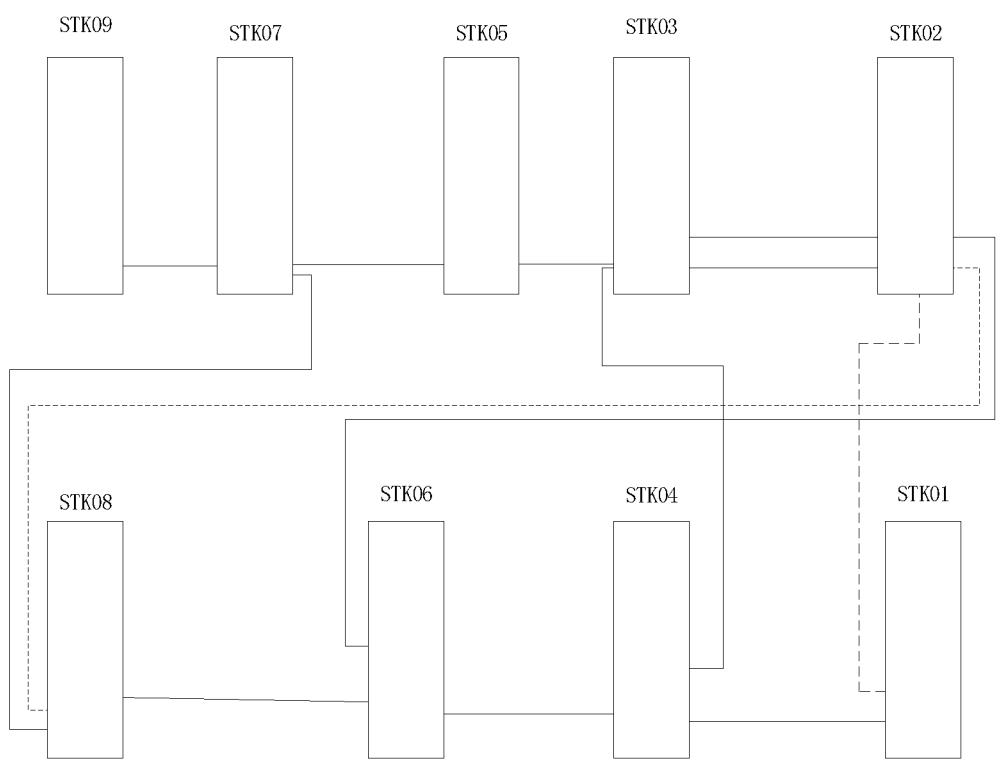
FIG. 5 shows a schematic diagram of a visualized logistics route according to an embodiment of the present disclosure.

For example, referring to FIG. 5, a schematic diagram of a visualized logistics route according to an embodiment of the present disclosure is shown. As shown in FIG. 5, whether the actual logistics is delivered in accordance with a standard (i.e., the material delivery model) can be determined based on the contents in FIG. 5. The solid line indicates a normal condition, and the dashed line indicates a warning condition (if the ratio of deliveries which are not in accordance with the standard exceeds 5%, that is, the aforementioned ratio threshold is 5%). Of course, in the specific implementation, the respective delivery routes shown in FIG. 5 may also be represented digitally. By means of such digital representation, after the comparison, the difference between the actual deliveries and the preset standard can be obtained. If the standard is not satisfied, an application programming interface (API) of the email service is called to automatically send a warning email (that is, to first connect to an email service connection protocol and port number; set whether to use a secure sockets layer (SSL) for security connection; set whether to display debug information, and display relevant information on a console, and obtain an answering object; acquire an email object; set an email address of a sender, an email address of a recipient, an email title and email content, and obtain a postman object; connect the user's own email account and password; and send an email); and a specific step section where a logistics problem occurs is displayed in the pop-out window (the display contents include a logistics route and a current production line).

In the above process, an amount of remaining materials in the material storage device may also be monitored; and when the amount of the remaining materials in the material storage device is relatively small, the business personnel is reminded in time to accelerate the supply of the materials to the material storage device.

In the embodiments of the present disclosure, the amount of remaining materials refers to the amount of materials remained in the material storage device. For example, when the amount of glass remained in the material storage device is 12 pieces, then the amount of remaining materials is 12.

It may be understood that, the foregoing examples are only examples enumerated for a better understanding of the technical solutions of the embodiments of the present disclosure, and are not intended to be the only limitation to the embodiments of the present disclosure.

Exemplarily, a monitoring device may be disposed to monitor a status of the remaining materials in the material storage device in real time. Alternatively, a business personnel may check the status of the remaining materials in the material storage device with a preset time interval, and record the amount of the remaining materials in the material storage device, and then make statistics on the amount of remaining materials as recorded.

Optionally, the method further includes: generating and sending prompt information for prompting that the materials are excessive in amount when the amount of remaining materials is greater than a first amount threshold, so as to prompt the business personnel that the materials in the material storage device are excessive in amount, and then a speed of supplying materials to the material storage device may be reduced.

The first amount threshold refers to a threshold that is preset by the business personnel for comparison with the amount of remaining materials, and the magnitude of the first amount threshold may be determined according to business requirements, which is not limited in the embodiments of the present disclosure.

Optionally, the method further includes: generating and sending prompt information for prompting that the materials are few in amount, when the amount of remaining materials is less than a second amount threshold, so as to prompt the business personnel that the materials in the material storage device are few in amount, and then the speed of supplying materials to the material storage device may be increased.

The second amount threshold refers to a threshold that is preset by the business personnel for comparison with the amount of remaining materials, and the magnitude of the second amount threshold may be determined according to business requirements, which is not limited in the embodiments of the present disclosure.

The first amount threshold is greater than the second amount threshold.

The embodiments of the present disclosure can perform an efficient and visualized warning for the material delivery process, and adjust the material transporting route intelligently, and provide an optimized scheme for the production line, which greatly reduces the occurrence of the logistics problem and avoids the production loss in the factory caused by logistics.

Figure 6:
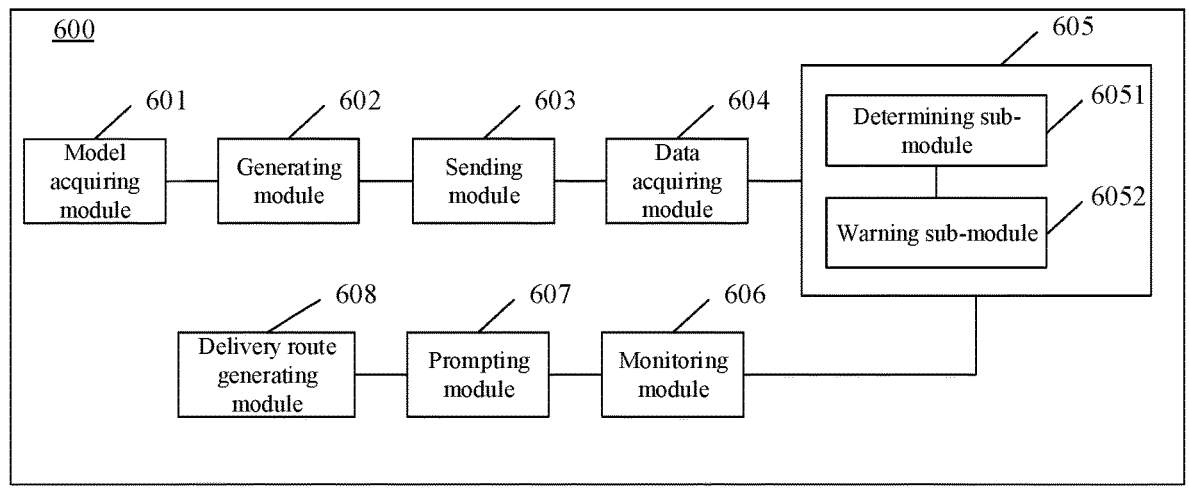
FIG. 6 shows a schematic structural diagram of an apparatus for delivering materials according to an embodiment of the present disclosure.

Referring to FIG. 6, a schematic structural diagram of an apparatus for delivering materials according to an embodiment of the present disclosure is shown. As shown in FIG. 6, the apparatus 600 for delivering the materials may include a model acquiring module 601, a generating module 602 and a sending module 603.

The model acquiring module 601 is configured to acquire a material delivery model of a target product, wherein the material delivery model includes a delivery route of the target product and a number of delivery times of each logistics transport device travelling along the delivery route within unit time. The generating module 602 is configured to generate, for each logistics transport device, delivery instructions within the unit time, based on the number of delivery times. The sending module 603 is configured to send the delivery instructions to the corresponding logistics transport devices.

Optionally, the generating module 602 is configured to generate, within the unit time and with a set time interval, delivery instructions for a first logistics transport device until a number of generated delivery instructions for the first logistics transport device reaches the number of delivery times corresponding to the first logistics transport device, wherein the first logistics transport device is one logistics transport device travelling along the delivery route.

Optionally, the number of delivery times of the logistics transport device is calculated based on an amount of materials required for producing the target product within the unit time, and a capacity of the logistics transport device.

Optionally, the apparatus further includes:
a data acquiring module 604 configured to acquire logistics delivery data of each logistics transport device; and
a warning module 605 configured to perform a warning of an abnormal delivery of the logistics transport device based on the logistics delivery data and the material delivery model.

Optionally, the logistics delivery data includes a receiving time at which materials are received by a material storage device corresponding to the logistics transport device, and a delivery starting address and a delivery starting time of the materials.

The warning module 605 includes:
a determining sub-module 6051 configured to determine a number of normally-executed delivery instructions within the unit time based on the receiving time, the delivery starting address and the delivery starting time; and
a warning sub-module 6052 configured to perform the warning when the number of the normally-executed delivery instructions does not match the number of delivery times.

Optionally, a condition that the number of the normally-executed delivery instructions does not match the number of delivery times includes any of the followings:
a difference between the number of the normally-executed delivery instructions and the number of delivery times exceeds a difference threshold; or
a ratio of the difference between the number of the normally-executed delivery instructions and the number of delivery times to the number of delivery times exceeds a ratio threshold.

Optionally, the warning module 605 is configured to perform the warning when the number of the normally-executed delivery instructions does not match the number of delivery times through at least one of the following manners:
generating warning information in email, and sending the warning information in email to an email address of a preset recipient; and
popping out a warning window in a designated page, and displaying delivery warning information in the warning window.

Optionally, each logistics transport device corresponds to a material storage device. The apparatus further includes:

a monitoring module 606 configured to monitor an amount of remaining materials in the material storage device;

a prompting module 607 configured to generate and send prompt information for prompting that the materials are excessive in amount when the amount of the remaining materials is greater than a first amount threshold; and/or, generate and send prompt information for prompting that the materials are few in amount when the amount of remaining materials is less than a second amount threshold;

wherein the first amount threshold is greater than the second amount threshold.

Optionally, each logistics transport device travelling along the delivery route of the target product corresponds to a plurality of production devices of the target product, and each production device corresponds to one material storage device. The apparatus further includes:

a delivery route generating module 608 configured to acquire a plurality of starting positions corresponding to the materials of the target product and device positions of the production devices corresponding to the target product; generate a plurality of delivery routes between the plurality of starting positions and the device positions of the production devices according to a production process of the target product; and select one delivery route from the plurality of delivery routes as the delivery route in the delivery model according to a first rule.

For the aforementioned method embodiments, in order to simply the description, the embodiments are described as a series of action combinations. However, it should be understood by those skilled in the art that, the present disclosure is not limited by the described sequences of the actions, because some steps may be implemented in other sequences or simultaneously according to the present disclosure. Secondly, it should be known by those skilled in the art that, the embodiments described in the present disclosure belong to optional embodiments, and those actions and modules involved herein are not necessarily essential to the present disclosure.

It should be noted that, when the apparatus for delivering the materials according to the above embodiments delivers the materials, an example is only given based on the division of the above functional modules. In actual applications, the foregoing functions can be allocated to and implemented by different functional modules according to requirements. That is, the internal structure of the apparatus can be divided into different functional modules to complete all or parts of the functions described above. In addition, the apparatus for delivering the materials according to the foregoing embodiments has the same concept as the method embodiment for delivering the materials, and thus the specific implementation process thereof may make a reference to the method embodiments, which will not be repeated here.

Additionally, an embodiment of the present disclosure further provides an electronic device. The electronic device includes a processor, a memory, and a computer program that is stored in the memory and operable on the processor, wherein the processor is configured to implement any of the above methods for delivering the materials when executing the program.

Figure 7:
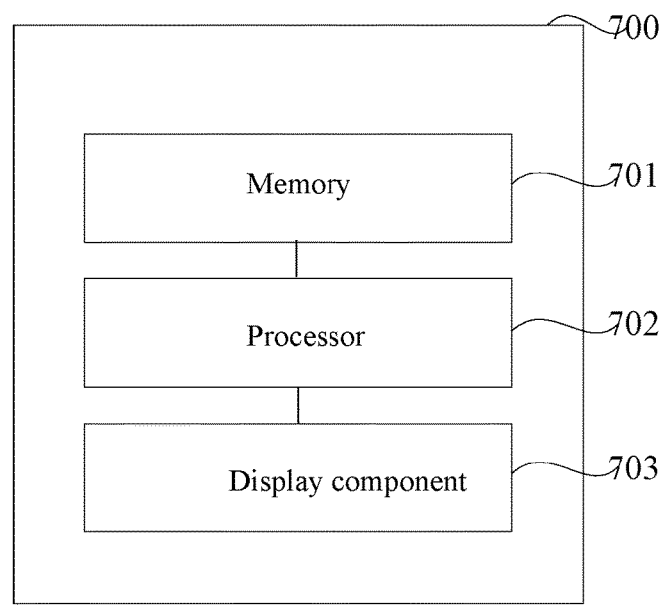
FIG. 7 shows a schematic structural diagram of an electronic device according to an embodiment of the present disclosure.

As shown in FIG. 7, an embodiment of the present disclosure further provides an electronic device. The electronic device is a computer device 700. Referring to FIG. 7, the computer device 700 includes a memory 701, a processor 702 and a display component 703. It can be understood by those skilled in the art that, the structure of the computer device 700 shown in FIG. 7 does not constitute any limitation to the computer device 700, and in actual applications, the computer device 700 may include more or less components than those illustrated, or the combinations of some components or different component arrangements.

The memory 701 may be configured to store a computer program and modules, and may mainly include a program storage region and a data storage region. The program storage region may store an operating system, an application program required by at least one function, and the like. The memory 701 may include a high-speed random access memory, and may further include a non-volatile memory, such as at least one magnetic disk storage device, a flash memory device, or other non-volatile solid-state storage devices. Correspondingly, the memory 701 may further include a memory controller so as to provide the processor 702 with access to the memory 701.

The processor 702 executes various functional applications and data processing by running software programs and modules stored in the memory 701, for example, executing the above method for delivering materials.

The display component 703 is configured to display images. The display component 703 may include a display panel. Optionally, the display panel may be configured in the forms of a liquid crystal display (LCD), an organic light-emitting diode (OLED), etc.

In an exemplary embodiment, a computer-readable storage medium is further provided, which is a non-volatile storage medium. The computer-readable storage medium stores a computer program therein. When the computer program in the computer-readable storage medium is executed by the processor, the method for delivering materials according to the embodiments of the present disclosure can be implemented.

In an exemplary embodiment, a computer program product with instructions stored therein is further provided. The instructions, when be run on a computer, enable the computer to execute the method for delivering materials according to the embodiments of the present disclosure.

The respective embodiments of the present description are described in a progressive manner, each embodiment focuses on illustrating the differences from other embodiments, and the same or similar parts among the embodiments may make a reference to one another.

Eventually, it should be noted that, as used herein, relation terms such as "first" and "second" are used merely for distinguishing a subject or an operation from another subject or operation, and it does not necessarily require or imply any substantial relation or sequence between these subjects or operations. Moreover, the terms "include/comprise", "contain" or any variation thereof are intended to cover a nonexclusive inclusion relationship, such that a process, a method, an item or a device containing a series of elements not only include these elements, but also include other elements that are not clearly listed, or also include an inherent element of such a process, method, item or device. Without further limitation, an element defined by a phrase "include/comprise a . . . " does not mean that another same element is not included in the process, method, item or device including the element.

An apparatus for delivering materials, a method for delivering materials, an electronic device and a computer-readable storage medium provided by the present disclosure have been introduced in detail. Specific examples are used herein to illustrate the principles and implementations of the present disclosure. The description of the above embodiments is only used to facilitate the understanding of the methods and core ideas of the present disclosure. At the same time, those of ordinary skill in the art may make changes to the specific implementations and the scope of application, based on the ideas of the present disclosure. In summary, the contents of the present description should not be construed as a limitation to the present disclosure.

What is claimed is:

1. A method for delivering materials, comprising:
acquiring a material delivery model of a target product, wherein the material delivery model comprises a delivery route of the target product and a number of delivery times of each of a plurality of logistics transport devices travelling along the delivery route within unit time;
generating, for each logistics transport device, delivery instructions within the unit time, based on the number of delivery times, wherein a number of the delivery instructions is equal to the number of delivery times of the corresponding logistics transport device; and
sending the delivery instructions to the corresponding logistics transport devices.

2. The method according to claim 1, wherein said generating, for each logistics transport device, delivery instructions within the unit time, based on the number of delivery times comprises:
generating, within the unit time and with a set time interval, delivery instructions for a first logistics transport device until a number of generated delivery instructions for the first logistics transport device reaches the number of delivery times corresponding to the first logistics transport device, wherein the first logistics transport device is one logistics transport device travelling along the delivery route.

3. The method according to claim 1, wherein the number of delivery times of the logistics transport device is calculated based on an amount of materials required for producing the target product within the unit time, and a capacity of the logistics transport device.

4. The method according to claim 1, further comprising:
acquiring logistics delivery data of each logistics transport device; and
performing a warning of an abnormal delivery of the logistics transport device based on the logistics delivery data and the material delivery model.

5. The method according to claim 4, wherein the logistics delivery data comprises a receiving time at which materials are received by a material storage device corresponding to the logistics transport device, and a delivery starting address and a delivery starting time of the materials; and
said performing a warning of an abnormal delivery of the logistics transport device based on the logistics delivery data and the material delivery model, comprises:
determining a number of normally-executed delivery instructions within the unit time based on the receiving time, the delivery starting address and the delivery starting time; and
performing the warning when the number of the normally-executed delivery instructions does not match the number of delivery times.

6. The method according to claim 5, wherein a condition for determining that the number of the normally-executed delivery instructions does not match the number of delivery times comprises any of the followings:
a difference between the number of the normally-executed delivery instructions and the number of delivery times exceeds a difference threshold; or
a ratio of the difference between the number of the normally-executed delivery instructions and the number of delivery times to the number of delivery times exceeds a ratio threshold.

7. The method according to claim 5, wherein said performing the warning when the number of the normally-executed delivery instructions does not match the number of delivery times, comprises:
performing the warning when the number of the normally-executed delivery instructions does not match the number of delivery times through at least one of the following manners:
generating warning information in email, and sending the warning information in email to an email address of a preset recipient; and
popping out a warning window in a designated page, and displaying delivery warning information in the warning window.

8. The method according to claim 1, wherein each logistics transport device corresponds to a material storage device, and the method further comprises:
monitoring an amount of remaining materials in the material storage device;
generating and sending prompt information for prompting that the materials are excessive in amount when the amount of the remaining materials is greater than a first amount threshold; and/or,
generating and sending prompt information for prompting that the materials are few in amount when the amount of remaining materials is less than a second amount threshold,
wherein the first amount threshold is greater than the second amount threshold.

9. The method according to claim 1, wherein each logistics transport device travelling along the delivery route of the target product corresponds to a plurality of production devices of the target product, and the method further comprises:
acquiring a plurality of starting positions corresponding to the materials of the target product and device positions of the production devices corresponding to the target product;
generating a plurality of delivery routes between the plurality of starting positions and the device positions of the production devices according to a production process of the target product; and
selecting one delivery route from the plurality of delivery routes as the delivery route in the delivery model according to a first rule.

10. An electronic device, comprising:
a processor, a memory, and a computer program that is stored in the memory and operable on the processor, wherein when executing the program, the processor is configured to implement a method for delivering materials comprising:
acquiring a material delivery model of a target product, wherein the material delivery model comprises a delivery route of the target product and a number of delivery times of each of a plurality of logistics transport devices travelling along the delivery route within unit time;
generating, for each logistics transport device, delivery instructions within the unit time, based on the number of delivery times, wherein a number of the delivery instructions is equal to the number of delivery times of the corresponding logistics transport device; and sending the delivery instructions to the corresponding logistics transport devices.

11. A computer-readable storage medium, in which a computer program is stored, wherein the program, when being executed by a processor, implements a method for delivering materials comprising:
    acquiring a material delivery model of a target product, wherein the material delivery model comprises a delivery route of the target product and a number of delivery times of each of a plurality of logistics transport devices travelling along the delivery route within unit time;
    generating, for each logistics transport device, delivery instructions within the unit time, based on the number of delivery times, wherein a number of the delivery instructions is equal to the number of delivery times of the corresponding logistics transport device; and
    sending the delivery instructions to the corresponding logistics transport devices.

12. The electronic device according to claim 10, wherein said generating, for each logistics transport device, delivery instructions within the unit time, based on the number of delivery times comprises:
    generating, within the unit time and with a set time interval, delivery instructions for a first logistics transport device until a number of generated delivery instructions for the first logistics transport device reaches the number of delivery times corresponding to the first logistics transport device, wherein the first logistics transport device is one logistics transport device travelling along the delivery route.

13. The electronic device according to claim 10, wherein the number of delivery times of the logistics transport device is calculated based on an amount of materials required for producing the target product within the unit time, and a capacity of the logistics transport device.

14. The electronic device according to claim 10, wherein the method further comprises:
    acquiring logistics delivery data of each logistics transport device; and
    performing a warning of an abnormal delivery of the logistics transport device based on the logistics delivery data and the material delivery model.

15. The electronic device according to claim 14, wherein the logistics delivery data comprises a receiving time at which materials are received by a material storage device corresponding to the logistics transport device, and a delivery starting address and a delivery starting time of the materials; and
    said performing a warning of an abnormal delivery of the logistics transport device based on the logistics delivery data and the material delivery model, comprises:
    determining a number of normally-executed delivery instructions within the unit time based on the receiving time, the delivery starting address and the delivery starting time; and
    performing the warning when the number of the normally-executed delivery instructions does not match the number of delivery times.

16. The electronic device according to claim 15, wherein a condition for determining that the number of the normally-executed delivery instructions does not match the number of delivery times comprises any of the followings:
    a difference between the number of the normally-executed delivery instructions and the number of delivery times exceeds a difference threshold; or
    a ratio of the difference between the number of the normally-executed delivery instructions and the number of delivery times to the number of delivery times exceeds a ratio threshold.

17. The electronic device according to claim 15, wherein said performing the warning when the number of the normally-executed delivery instructions does not match the number of delivery times, comprises:
    performing the warning when the number of the normally-executed delivery instructions does not match the number of delivery times through at least one of the following manners:
    generating warning information in email, and sending the warning information in email to an email address of a preset recipient; and
    popping out a warning window in a designated page, and displaying delivery warning information in the warning window.

18. The electronic device according to claim 1, wherein each logistics transport device corresponds to a material storage device, and the method further comprises:
    monitoring an amount of remaining materials in the material storage device;
    generating and sending prompt information for prompting that the materials are excessive in amount when the amount of the remaining materials is greater than a first amount threshold; and/or,
    generating and sending prompt information for prompting that the materials are few in amount when the amount of remaining materials is less than a second amount threshold,
    wherein the first amount threshold is greater than the second amount threshold.

19. The electronic device according to claim 1, wherein each logistics transport device travelling along the delivery route of the target product corresponds to a plurality of production devices of the target product, and the method further comprises:
    acquiring a plurality of starting positions corresponding to the materials of the target product and device positions of the production devices corresponding to the target product;
    generating a plurality of delivery routes between the plurality of starting positions and the device positions of the production devices according to a production process of the target product; and
    selecting one delivery route from the plurality of delivery routes as the delivery route in the delivery model according to a first rule.

* * * * *